(12) United States Patent
Bombet et al.

(10) Patent No.: US 9,009,358 B1
(45) Date of Patent: Apr. 14, 2015

(54) CONFIGURING A DATA STORAGE DEVICE WITH A PARAMETER FILE INTERLOCKED WITH CONFIGURATION CODE

(75) Inventors: Marc A. Bombet, Trabuco Canyon, CA (US); Jan F. Rebalski, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 464 days.

(21) Appl. No.: 12/236,278

(22) Filed: Sep. 23, 2008

(51) Int. Cl.
| | |
|---|---|
| G06F 3/00 | (2006.01) |
| G06F 13/38 | (2006.01) |
| G06F 15/177 | (2006.01) |
| G06F 9/44 | (2006.01) |

(52) U.S. Cl.
CPC .................................. G06F 9/4411 (2013.01)

(58) Field of Classification Search
None
See application file for complete search history.

(56) References Cited

U.S. PATENT DOCUMENTS

| | | | |
|---|---|---|---|
| 5,440,716 A * | 8/1995 | Schultz et al. ................ | 711/114 |
| 5,515,524 A * | 5/1996 | Lynch et al. .................... | 703/13 |
| 5,657,448 A | 8/1997 | Wadsworth et al. | |
| 5,682,513 A | 10/1997 | Candelaria et al. | |
| 5,913,218 A | 6/1999 | Carney et al. | |
| 5,996,027 A | 11/1999 | Volk et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,247,128 B1 * | 6/2001 | Fisher et al. ................. | 713/100 |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |

(Continued)

OTHER PUBLICATIONS

Office Action dated Sep. 16, 2010 from U.S. Appl. No. 12/253,832, 19 pages.

(Continued)

*Primary Examiner* — Michael Sun

(57) ABSTRACT

A method is disclosed for configuring a data storage device. Configuration data records of a parameter file are compared to configuration execution records of an executable file, wherein the configuration execution records for configuring at least one configuration file of a data storage device. If the configuration data records interlock with the configuration execution records, the configuration file is modified and the modified configuration file is stored to the data storage device. The method may be performed by a computer external to the data storage device, or by control circuitry internal to the data storage device, or a combination of both.

21 Claims, 10 Drawing Sheets

(56) References Cited

U.S. PATENT DOCUMENTS

| | | |
|---|---|---|
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,301,696 B1 | 10/2001 | Lien et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,587,124 B1 | 7/2003 | Slaby |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,640,278 B1 | 10/2003 | Nolan et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,862,704 B1 | 3/2005 | Miner |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |

(56) References Cited

U.S. PATENT DOCUMENTS

| | | |
|---|---|---|
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,058,759 B1 | 6/2006 | Reiser et al. |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,541 B2 | 9/2006 | Bruner et al. |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,162,578 B2 | 1/2007 | Bruner et al. |
| 7,171,108 B1 | 1/2007 | Masters et al. |
| 7,171,110 B1 | 1/2007 | Wilshire |
| 7,188,330 B2 | 3/2007 | Goyal |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,289,291 B1 | 10/2007 | Schlumberger |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,450,084 B2 | 11/2008 | Fuller et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,555,570 B2 | 6/2009 | Hickey et al. |
| 7,562,282 B1 | 7/2009 | Rothberg |
| 7,577,783 B2 | 8/2009 | Hsu et al. |
| 7,577,973 B1 | 8/2009 | Kapner, III et al. |
| 7,590,835 B1 | 9/2009 | Nallagatla et al. |
| 7,596,797 B1 | 9/2009 | Kapner, III et al. |
| 7,599,139 B1 | 10/2009 | Bombet et al. |
| 7,613,842 B2 | 11/2009 | Kong |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,441 B2 | 3/2010 | Burton et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |

(56) References Cited

U.S. PATENT DOCUMENTS

| | | |
|---|---|---|
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 * | 7/2013 | Strecke et al. ............... 711/170 |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,282 B2 * | 8/2014 | Goldenberg et al. .......... 707/736 |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2001/0039648 A1 | 11/2001 | Imamura et al. |
| 2002/0073304 A1 | 6/2002 | Marsh et al. |
| 2002/0095537 A1 | 7/2002 | Slater |
| 2003/0023966 A1 | 1/2003 | Shimizu et al. |
| 2003/0070053 A1 | 4/2003 | Gallo et al. |
| 2003/0084112 A1 | 5/2003 | Curray et al. |
| 2003/0095648 A1 | 5/2003 | Kaib et al. |
| 2003/0115297 A1 | 6/2003 | Branson et al. |
| 2004/0059537 A1 | 3/2004 | McIntosh et al. |
| 2004/0088367 A1 * | 5/2004 | Reinke ....................... 709/215 |
| 2004/0088473 A1 | 5/2004 | Ogle |
| 2005/0177829 A1 * | 8/2005 | Vishwanath ................. 717/177 |
| 2005/0195515 A1 | 9/2005 | Bruner et al. |
| 2005/0223374 A1 | 10/2005 | Wishart et al. |
| 2005/0240686 A1 | 10/2005 | Kashiwagi |
| 2005/0251799 A1 | 11/2005 | Wang |
| 2005/0273549 A1 | 12/2005 | Roohparvar |
| 2006/0031454 A1 | 2/2006 | Ewing et al. |
| 2006/0200262 A1 | 9/2006 | Dyer |
| 2006/0252522 A1 | 11/2006 | Walker et al. |
| 2007/0152058 A1 | 7/2007 | Yeakley et al. |
| 2007/0168478 A1 | 7/2007 | Crosbie |
| 2007/0180168 A1 | 8/2007 | Chikusa et al. |
| 2007/0220248 A1 | 9/2007 | Bittlingmayer et al. |
| 2008/0010685 A1 | 1/2008 | Holtzman et al. |
| 2008/0045177 A1 | 2/2008 | Wise |
| 2008/0126773 A1 * | 5/2008 | Martinez et al. ................ 713/1 |
| 2008/0256406 A1 | 10/2008 | Arnold |
| 2008/0313628 A1 | 12/2008 | Justus et al. |
| 2009/0028339 A1 | 1/2009 | Goodman et al. |
| 2009/0106546 A1 | 4/2009 | Weichel et al. |
| 2009/0113702 A1 | 5/2009 | Hogg |

(56) References Cited

U.S. PATENT DOCUMENTS

| | | |
|---|---|---|
| 2009/0172384 A1 | 7/2009 | Anson |
| 2009/0213655 A1 | 8/2009 | Roohparvar |
| 2010/0192127 A1 | 7/2010 | Son et al. |
| 2010/0306551 A1 | 12/2010 | Meyer et al. |
| 2011/0226729 A1 | 9/2011 | Hogg |
| 2011/0231424 A1 | 9/2011 | Avdanina |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

Office Action dated Mar. 3, 2011 from U.S. Appl. No. 12/253,832, 15 pages.
Notice of Allowance dated Mar. 29, 2011 from U.S. Appl. No. 12/253,832, 10 pages.
Office Action dated Dec. 23, 2011 from U.S. Appl. No. 13/162,506, 11 pages.
Final Office Action dated May 21, 2012 from U.S. Appl. No. 13/162,506, 12 pages.
Office Action dated Sep. 26, 2012 from U.S. Appl. No. 12/635,487, 16 pages.

* cited by examiner

GUI PARAMETER SETUP

| Feature/Parameter | Customer 1 | Customer 2 |
|---|---|---|
| ATA Security | | |
|   Supported | true | false |
| Offline Scan | | |
|   Supported | true | false |
|   Timer | 0400 | 0700 |
| Acoustic Management | | |
|   Enable | true | false |
|   Level | ◇ Performance Mode | ◇ Performance Mode / Quiet Mode / Factory Mode |
| Firmware Version | | |
|   Supported | true | false |
|   Version | "HP 10.6.7.00.1" | "DELL 10.6.7.00.1" |

FIG. 2

```
// Structure for 0x115 record
typedef struct
{
    UINT32    signature;
    UINT16    feature_id;
    UINT16    parameter_id;
    UINT16    parameter_type;
    UINT16    parameter_length;
    VAR       parameter_value;
}
```

FIG. 3A

```
// Structure for 0x118 record
typedef struct
{
    UINT16    feature_id;
    UINT16    parameter_id;
    UINT16    parameter_type;
    UINT16    parameter_length;
    UINT16    actual_length;
    UINT8     feat_enabled;
    UINT16    file_section;
    UINT16    file_offset;
    UINT16    bit_number;
    UINT32    expected_value;
    UINT8     setting_no;
    UINT8     settints_per_feature;
}
```

FIG. 3B

// ** ATA Security *

{1, 1, BOOLEAN, LENGTH_BYTE, sizeof (CFG_DRV_LOCK), ENABLE, FM_CONFIG_DATA, PASSWORD_OFFSET, CFG_DRV_LOCK_OFFSET, PS_CAPABLE, 1, 1, 2};

{1, 1, BOOLEAN, LENGTH_BYTE, sizeof (CFG_AUTHENTICATION), ENABLE, FM_CONFIG_DATA, PASSWORD_OFFSET, CFG_AUTHENTICATION_OFFSET, PWEN, 1, 2, 2};

{1, 1, BOOLEAN, LENGTH_BYTE, sizeof (CFG_DRV_LOCK), DISABLE, FM_CONFIG_DATA, PASSWORD_OFFSET, CFG_DRV_LOCK_OFFSET, PS_CAPABLE, 0, 1, 2};

{1, 1, BOOLEAN, LENGTH_BYTE, sizeof (CFG_AUTHENTICATION), DISABLE, FM_CONFIG_DATA, PASSWORD_OFFSET, CFG_AUTHENTICATION_OFFSET, PWEN, 0, 2, 2};

// ** Offline Scan *

{2, 1, BOOLEAN, LENGTH_BYTE, sizeof (SMART_VAR_GEN_PURPOSE_FLAG), ENABLE, FM_DRM_PROTO_LOG, SECTION8_OFFSET, GPD_LSUBSECTION1_OFFSET, AUTO_OL_ENABLED_BIT, 1, 1, 1};

{2, 1, BOOLEAN, LENGTH_BYTE, sizeof (SMART_VAR_GEN_PURPOSE_FLAG), DISABLE, FM_DRM_PROTO_LOG, SECTION8_OFFSET, GPD_LSUBSECTION1_OFFSET, AUTO_OL_ENABLED_BIT, 0, 1, 1};

{2, 2, VALUE, sizeof (CFG_OFFLINE_TIMER) , sizeof (CFG_OFFLINE_TIMER), ENABLE, FM_CONFIG_DATA, BACKGROUND_OFFSET, CFG_OFFLINE_TIMER_OFFSET, UNRELATED, UNRELATED, 1, 1};

FIG. 4A

// ** Automatic Acoustic Management (AAM) **

{3, 1, BOOLEAN, LENGTH_BYTE, sizeof (CFG_ACMGTEN), ENABLE, FM_CONFIG_DATA, FEATURES_OFFSET, CFG_CONTROL_OFFSET, ACMGTEN, 1, 1, 1},
{3, 1, BOOLEAN, LENGTH_BYTE, sizeof (CFG_ACMGTEN), DISABLE, FM_CONFIG_DATA, FEATURES_OFFSET, CFG_CONTROL_OFFSET, ACMGTEN, 0, 1, 1}, {3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(0), 0, 1, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(1), 0, 2, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Perfom_Mode, 1), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(4), 1, 5, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(5), 1, 6, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(6), 0, 7, 7}, // ** Firmware Version **

{4, 1, STRING, LENGTH_STRING, sizeof (FW_VERSION), ENABLE, FM_CONFIG_DATA, FIRMWARE_OFFSET, FW_SUPPORT_OFFSET, FWSUP, 1, 1, 1},
{4, 1, STRING, LENGTH_STRING, sizeof (FW_VERSION), DISABLE, FM_CONFIG_DATA, FIRMWARE_OFFSET, FW_SUPPORT_OFFSET, FWSUP, 0, 1, 1}, {4, 2, STRING, LENGTH_STRING, sizeof (FW_VERSION), UNRELATED, FM_CONFIG_DATA, FIRMWARE_OFFSET, VERSION_OFFSET, UNRELATED, 1, 1},

FIG. 4B

CONFIGURING A DATA STORAGE DEVICE WITH A PARAMETER FILE INTERLOCKED WITH CONFIGURATION CODE

BACKGROUND

Description of the Related Art

When manufacturing data storage devices, such as disk drives, each data storage device is typically configured according to the specifications of each individual customer (e.g., each PC manufacturer). For example, certain features may be enabled or disabled, or the disk drive may be configured to operate in various modes of operation, such as different security modes, different performance/acoustic modes, etc. Configuring the disk drive typically involves modifying configuration files stored in the disk drive. When a disk drive is powered on, the control circuitry reads the configuration files and configures itself accordingly.

In the past, a feature specification engineer has typically maintained a feature spreadsheet that specifies the features requested for each customer. From the feature spreadsheet a firmware engineer generates executable code for implementing each feature, wherein the executable code reads appropriate data from configuration files. For each customer, a configuration engineer typically creates a corresponding configuration spreadsheet that specifies how to initialize the configuration files to be stored on each disk drive. When a newly manufactured disk drive is powered on, the executable code reads the configuration files and configures the disk drive accordingly.

The above process is subject to human error since the configuration engineer may make input errors when generating the configuration spreadsheet such that the configuration spreadsheet is not compatible with the executable code. In addition, operator error may occur when the feature spreadsheet is modified and the modification does not propagate correctly to the configuration spreadsheet. If the configuration spreadsheet and corresponding configuration files are incorrect, it may lead to the recall of thousands of misconfigured disk drives.

BRIEF DESCRIPTION OF THE DRAWINGS

FIG. 2 illustrates an embodiment of the present invention wherein a graphical user interface is employed to generate the configuration data records.

FIG. 3A shows a configuration data structure according to an embodiment of the present invention.

FIG. 3B shows a configuration execution record according to an embodiment of the present invention.

FIGS. 4A and 4B show example configuration execution records in the form of a table in a ".h" file.

DETAILED DESCRIPTION OF EMBODIMENTS OF THE INVENTION

Figure 1:
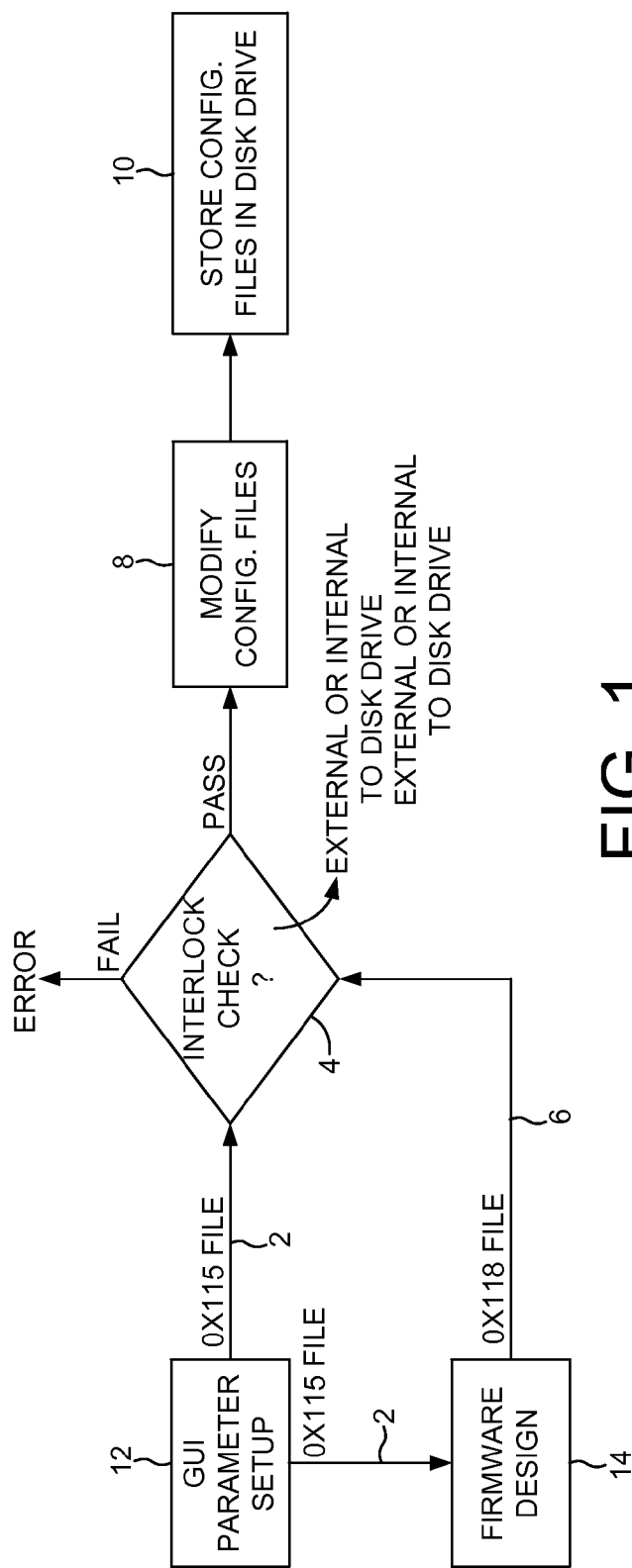
FIG. 1 illustrates a method according to an embodiment of the present invention for configuring a data storage device, such as a disk drive, by comparing configuration data records of a parameter file to configuration execution records of an executable file.

FIG. 1 illustrates a method of configuring a data storage device, such as a disk drive. Configuration data records of a parameter file 2 are compared (step 4) to configuration execution records of an executable file 6, wherein the configuration execution records for configuring at least one configuration file of a disk drive. If the configuration data records interlock with the configuration execution records, the configuration file is modified (step 8) and the modified configuration file is stored to the disk drive (step 10). The method may be performed by a computer external to the disk drive, or by control circuitry internal to the disk drive, or a combination of both. Also, although a disk drive is discussed for illustrative purposes, embodiments of the present invention may include other data storage devices, such as solid state drives, flash memory, optical data storage devices (e.g., CD-ROM), etc.

In the embodiment of FIG. 1, the parameter file 2 may be referred to as a 0x115 file and the executable file 6 may be referred to as a 0x118 file. Also in the embodiment of FIG. 1, the configuration data records may be generated using a graphical user interface (GUI) (step 12). The resulting 0x115 file is evaluated by firmware design engineers who implement the corresponding 0x118 file that will configure the disk drive. In an embodiment described below with reference to FIGS. 4A and 4B, the 0x118 file is implemented as a ".h" file which is interpreted in order to configure the disk drive as specified by a 0x115 file generated using the GUI (step 12).

FIG. 2 shows an example GUI for generating the configuration data records (0x115 records) of the parameter file (0x115 file). In the example shown, there are a number of configurable features, wherein each feature may have one or more parameters. Each parameter may be one of a plurality of types, such as a Boolean type, a value type, an enumerated type, or a string type. The GUI may display the configuration settings for a number of different configurations, for example, for a number of different customers (e.g., PC manufacturers). In one embodiment, the GUI protects against invalid user input. For example, the GUI may provide only two possible values for a Boolean type (true or false), or the GUI may limit the possible settings for a value type. Similarly, an enumerated type may be restricted to only the values that may be selected from a drop-down menu as illustrated in FIG. 2. A string value (e.g., the firmware version parameter) may be limited by a minimum and/or maximum number of characters for the string.

FIG. 3A shows an example format for a configuration data record (a 0x115 record), and FIG. 3B shows an example format for a configuration execution record (a 0x118 record). The 0x115 record comprises a signature field which stores a special value that demarks the beginning of the record within the 0x115 file. The feature ID identifies the feature number, and the parameter ID identifies the parameter number. The parameter type may be any suitable value (e.g., Boolean, value, enumerated, string, etc.), and the parameter length specifies the byte length of the parameter value. The length of the parameter value may vary, for example, if the parameter type is string. Since the parameter value has a variable length, the signature field identifies the beginning of each 0x115 record in the 0x115 file.

In one embodiment, the common fields between a 0x115 record are compared to the 0x118 records in order to determine whether the 0x115 record interlocks with one of the 0x118 records. The parameter value of the 0x115 record may also be compared to a feature_enabled field of the 0x118 record. In one embodiment, there must be a match between all of the interlock fields in order to find an interlocking record. If an interlock is found, the remaining fields of the 0x118 record specify how to modify the configuration file of the disk drive in order to implement the requested configuration. In the example of FIG. 3B, the fields of a 0x118 record include an actual length field which specifies the actual length (bits or bytes) to modify in the configuration file. A file section field, file offset field, and bit number field specify the exact location within the configuration file to modify. In addition, certain 0x115 records may correspond to multiple 0x118 records that modify multiple settings of a configuration file (e.g., multiple bits). In this embodiment, the 0x118 records further include a settings_per_feature field and a setting_no field which specify the total number of settings and the setting number being configured for a particular 0x118 record.

The 0x118 records may be implemented in any suitable manner, and in an embodiment illustrated in FIGS. 4A and 4B, the 0x118 records are implemented as a table defined in a ".h" file. The first four entries in the table of FIG. 4A correspond to an ATA security setting. The feature ID is one, the parameter ID is one, and the type is Boolean indicating the ATA security feature is either enabled or disabled. The feature_enabled field specifies either "ENABLE" or "DISABLE", followed by three fields which specify the location within the configuration file to modify. In this example, there are two bits that are configured (set or reset) and therefore there are two corresponding table entries. When a 0x115 record is received to configure this feature, all of the corresponding fields must match, including whether to ENABLE or DISABLE the feature. When a match is found, the configuration file is modified as specified by the two table entries of the matching 0x118 record.

The second feature in FIG. 4A corresponds to an offline scan of the disk drive. This feature has a first Boolean parameter to enable/disable the feature, and a second value parameter (a timer) that specifies how long the disk drive must remain idle before beginning (or continuing) the offline scan. Since the timer is of type value, the expected_value field of the 0x118 record is set to UNRELATED since there is no expected value. The bit_number field of the 0x118 record is also set to UNRELATED since the value modifies one or more bytes.

FIG. 4B illustrates an enumerated parameter (the second parameter of the AAM feature) wherein there are three possible values for the enumerated value (see the example of FIG. 2). For each of the three possible values, a byte in the configuration file is modified with a particular bit pattern. In other words, the byte in the configuration file can only take on three possible values as defined by the 0x118 record, and these three values correspond to the only possible selections provided in the drop-down menu of the GUI in FIG. 2. When a match between a 0x115 record and the 0x118 record is found, there will be a match of all seven table entries shown in FIG. 4B, and therefore all seven table entries will be processed in order to configure the corresponding byte of the configuration file. The last feature in FIG. 4B corresponds to a firmware version which comprises a Boolean parameter indicating whether the feature is enabled, and a string value for specifying the version number (see FIG. 2). Similar to a value type, with a string type the expected_value of the corresponding 0x118 record is set to UNRELATED since there is no expected value for a string type.

Figure 5:
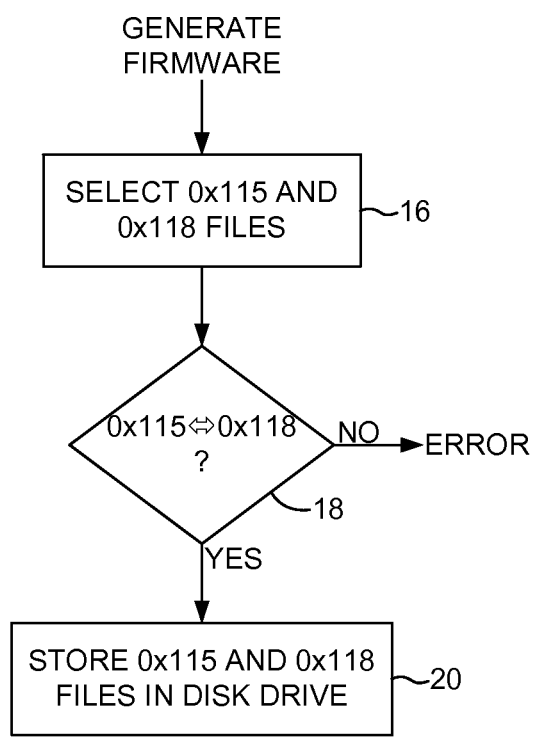
FIG. 5 is a flow diagram according to an embodiment of the present invention wherein the configuration execution records are integrated with firmware and then interlock checked with configuration data records prior to loading the firmware and configuration data records to the disk drive.

FIG. 5 is a flow diagram according to an embodiment of the present invention wherein when generating a new firmware version that is to be downloaded into a disk drive, a 0x115 file and a 0x118 file is selected (step 16). For example, an engineer may select from a database an executable file that includes a 0x118 file, and then select from the database a 0x115 file. The 0x115 records of the 0x115 file are then compared to the 0x118 records of the 0x118 file to ensure that all of the 0x115 records interlock with a corresponding 0x118 record (step 18). If not, an error is generated and the firmware is not downloaded into the disk drive. Otherwise, the firmware (including the 0x115 and 0x118 files) are downloaded into the disk drive (step 20).

Figure 6:
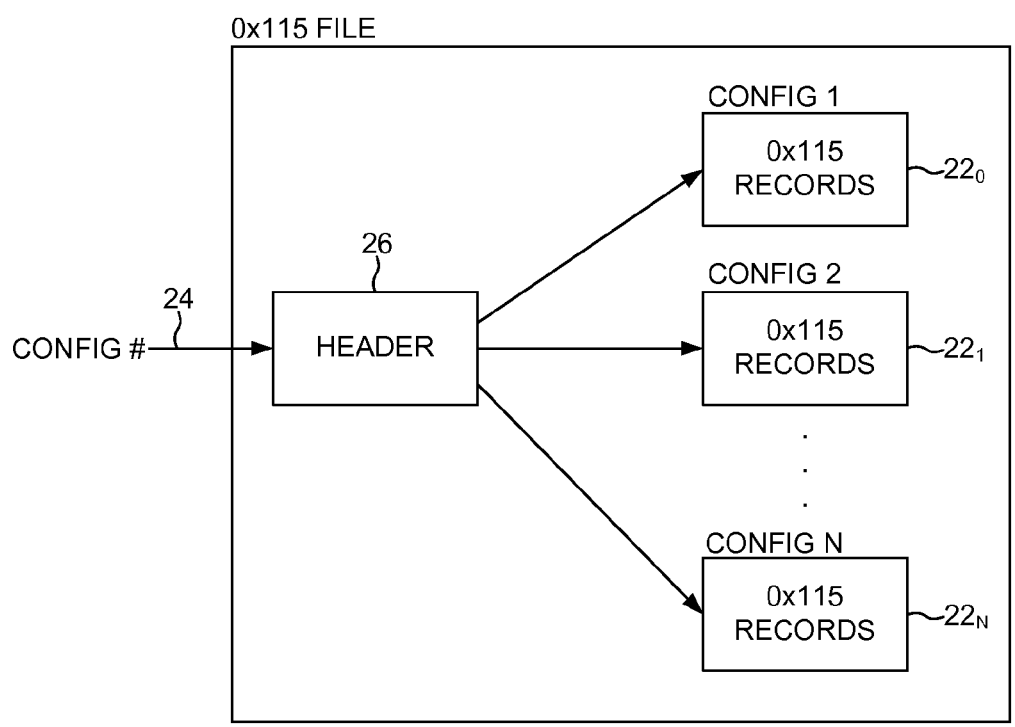
FIG. 6 shows an embodiment of the present invention wherein a configuration data file stores a plurality of configuration data record sets each corresponding to a particular configuration for the disk drive.

FIG. 6 shows an embodiment of the present invention wherein the 0x115 file comprises a plurality of 0x115 record sets $22_0$-$22_N$, wherein each 0x115 record set $22_i$ corresponds to a particular configuration (e.g., for a particular customer). A configuration code 24 is received by the disk drive which indexes a header structure 26 that is used to select the corresponding 0x115 record set. This embodiment enables a single firmware version (including 0x115 file and 0x118 file) to be downloaded into a disk drive, and then to configure the disk drive into a desired state. For example, the disk drive may be configured into various states in order to perform various manufacturing test procedures, and then configured into a final state corresponding to a particular customer (e.g., a PC manufacturers).

Figure 7A:
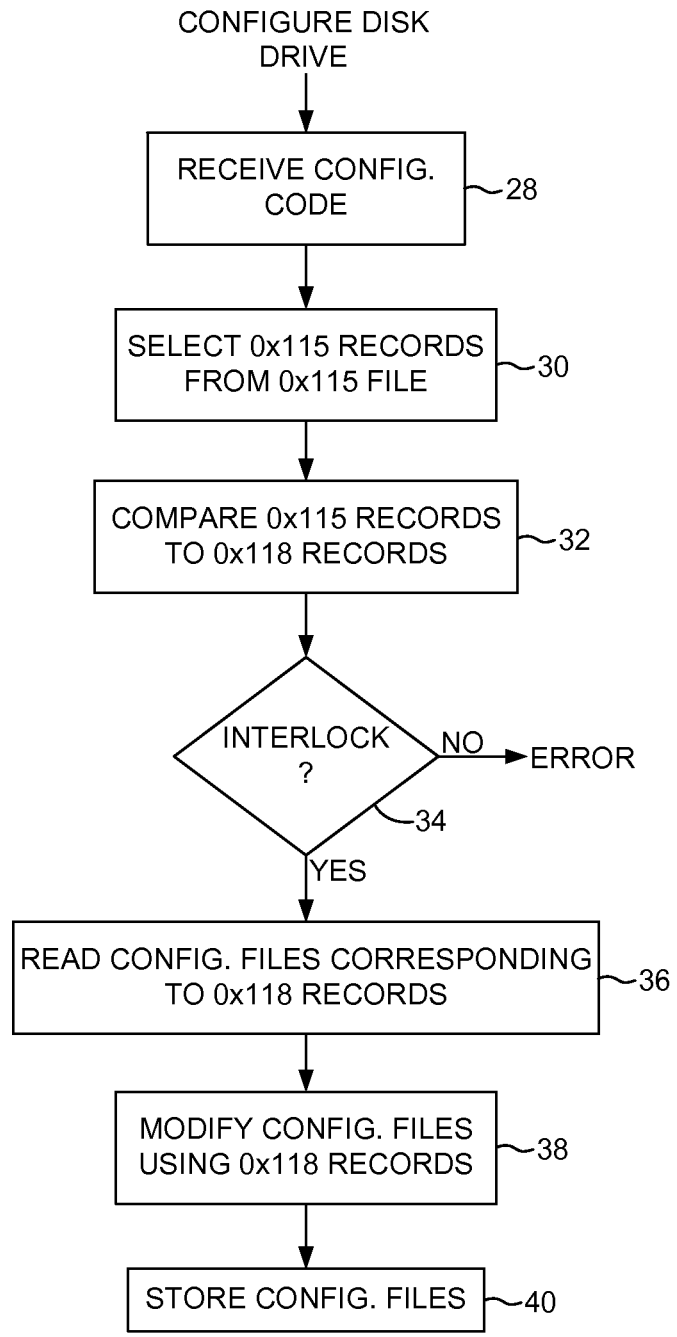
FIG. 7A is a flow diagram according to an embodiment of the present invention wherein the control circuitry within the disk drive performs an interlock check on a selected configuration data record set.

FIG. 7A shows a flow diagram according to an embodiment of the present invention wherein when configuring a disk drive, a configuration code is received by the disk drive (step 28) and a corresponding 0x115 record set is selected from the 0x115 file (step 30). The 0x115 records are then compared to the 0x118 records (step 32) and if a match is found (interlock) for all of the 0x115 records (step 34), then the configuration file (or files) corresponding to the matching 0x118 records are read (step 36), modified using the matching 0x118 records (step 38), and then stored back to the disk drive (step 40). The configuration files may be stored in any suitable manner, such as in a non-volatile semiconductor memory (e.g., a flash memory), and one or more of the configuration files may also be stored on the disk of the disk drive.

Figure 7B:
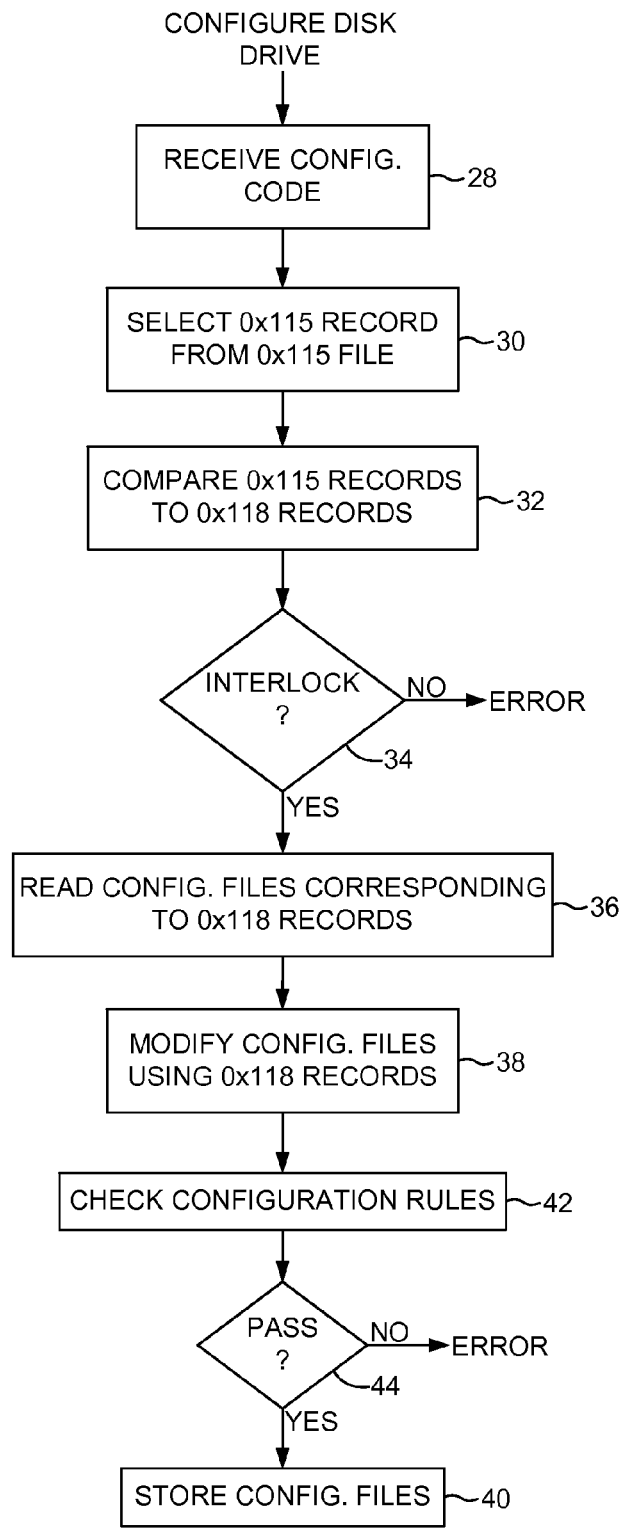
FIG. 7B is a flow diagram according to an embodiment of the present invention wherein the control circuitry within the disk drive checks configuration rules for a selected configuration data record set.

FIG. 7B is a flow diagram which expands on the flow diagram of FIG. 7A, wherein after modifying the configuration files (step 38), a number of configuration rules are checked (step 42) in order to verify the validity of the configuration. Any suitable configuration rule may be checked, such as a dependency check wherein a first parameter may be set to a selected value only if one or more other parameters are set to predetermined values. In another embodiment, the configuration rules comprise an exclusivity check wherein if a first parameter is enabled, one or more other parameters must be disabled. Yet another configuration rule may comprise a range check wherein a parameter value must fall within a predetermined range. The configuration rules checked at step 42 may comprise any combination of dependency, exclusivity, and range checking rules.

Figure 8:
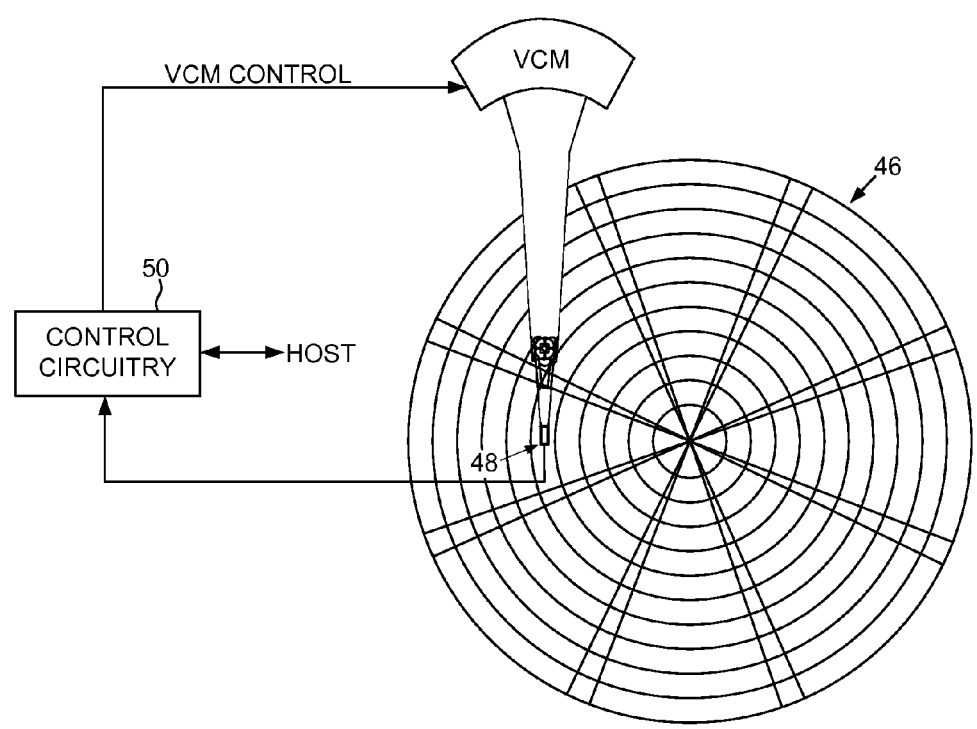
FIG. 8 shows a disk drive according to an embodiment of the present invention comprising a disk, a head actuated over the disk, and control circuitry for configuring the disk drive.

FIG. 8 shows a disk drive according to an embodiment of the present invention comprising a disk 46, a head 48 actuated over the disk 46, and control circuitry 50 operable to communicate with a host. The control circuitry is further operable to configure the disk drive by comparing configuration data records (0x115 records) of a parameter file to configuration execution records (0x118 records) of an executable file, wherein the configuration execution records for configuring at least one configuration file of a disk drive. If the configuration data records interlock with the configuration execution records, the control circuitry 50 modifies the configuration file and stores the modified configuration file to the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of configuring a data storage device comprising:
   comparing configuration data records of a parameter file to configuration execution records of an executable file, wherein the configuration execution records are for configuring at least one configuration file of the data storage device; and
   when the configuration data records interlock with the configuration execution records, modifying the configuration file and storing the modified configuration file to the data storage device,
   wherein:
      the configuration data records comprise a first plurality of fields;
      the configuration execution records comprise a second plurality of fields; and
      a configuration data record interlocks with a configuration execution record when at least one field value of the configuration data record matches at least one field value of the configuration execution record.

2. The method as recited in claim 1, wherein the matching field value specifies a feature.

3. The method as recited in claim 2, wherein the matching field value specifies a parameter of the feature.

4. The method as recited in claim 1, wherein the matching field value specifies a parameter type.

5. The method as recited in claim 1, wherein the matching field value specifies a parameter length.

6. The method as recited in claim 1, wherein the matching field value specifies a parameter value.

7. The method as recited in claim 1, further comprising checking at least one configuration rule for the configuration data records.

8. The method as recited in claim 1, wherein a host computer connected to the data storage device compares the configuration data records of the parameter file to the configuration execution records of the executable file.

9. The method as recited in claim 1, wherein control circuitry within the data storage device compares the configuration data records of the parameter file to the configuration execution records of the executable file.

10. A data storage device comprising control circuitry operable to:
    compare configuration data records of a parameter file to configuration execution records of an executable file, wherein the configuration execution records for configuring at least one configuration file of the data storage device; and
    when the configuration data records interlock with the configuration execution records, modify the configuration file,
    wherein:
       the configuration data records comprise a first plurality of fields;
       the configuration execution records comprise a second plurality of fields; and
       a configuration data record interlocks with a configuration execution record when at least one field value of the configuration data record matches at least one field value of the configuration execution record.

11. The data storage device as recited in claim 10, wherein the matching field value specifies a feature.

12. The data storage device as recited in claim 11, wherein the matching field value specifies a parameter of the feature.

13. The data storage device as recited in claim 10, wherein the matching field value specifies a parameter type.

14. The data storage device as recited in claim 10, wherein the matching field value specifies a parameter length.

15. The data storage device as recited in claim 10, wherein the matching field value specifies a parameter value.

16. The data storage device as recited in claim 10, wherein the control circuitry is further operable to check at least one configuration rule for the configuration data records.

17. The data storage device as recited in claim 16, wherein the configuration rule comprises a dependency check.

18. The data storage device as recited in claim 16, wherein the configuration rule comprises an exclusivity check.

19. The data storage device as recited in claim 16, wherein the configuration rule comprises a range check.

20. The data storage device as recited in claim 10, further comprising:
    a disk; and
    a head actuated over the disk.

21. A computer program embodied on a non-transitory computer readable medium, the computer program comprising code segments for configuring a data storage device by:
    comparing configuration data records of a parameter file to configuration execution records of an executable file, wherein the configuration execution records for configuring at least one configuration file of the data storage device; and
    when the configuration data records interlock with the configuration execution records, modifying the configuration file and storing the modified configuration file to the data storage device;
    wherein:
       the configuration data records comprise a first plurality of fields;
       the configuration execution records comprise a second plurality of fields; and
       a configuration data record interlocks with a configuration execution record when at least one field value of the configuration data record matches at least one field value of the configuration execution record.

* * * * *